United States Patent Office 3,248,199
Patented Apr. 26, 1966

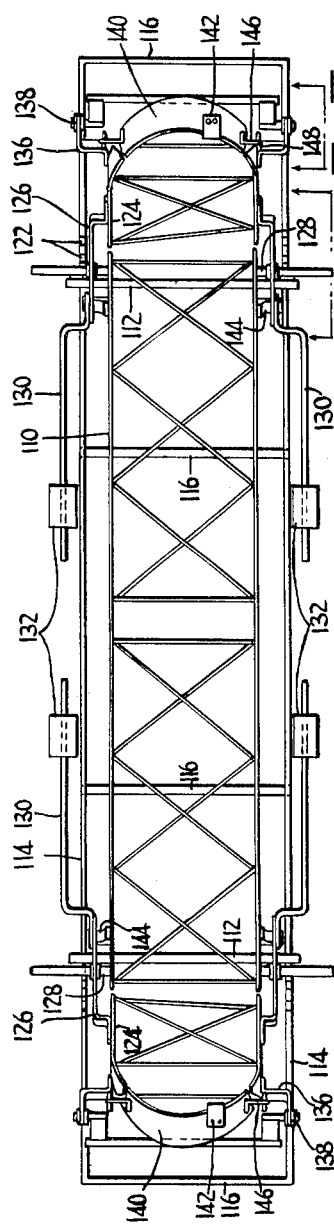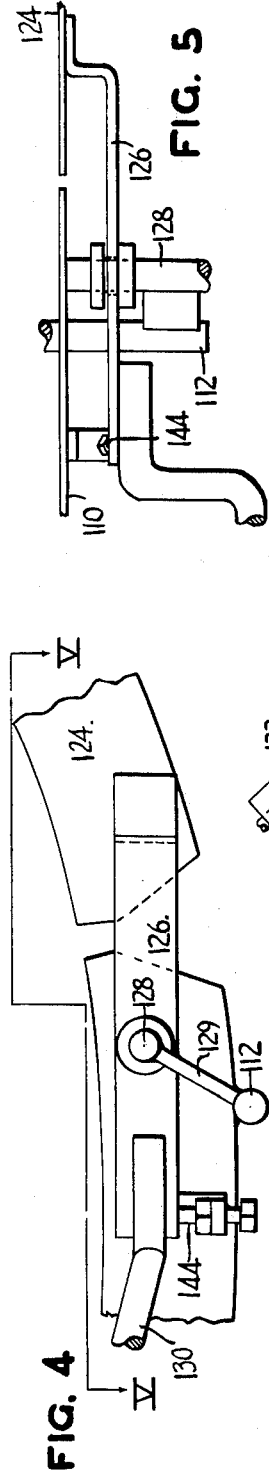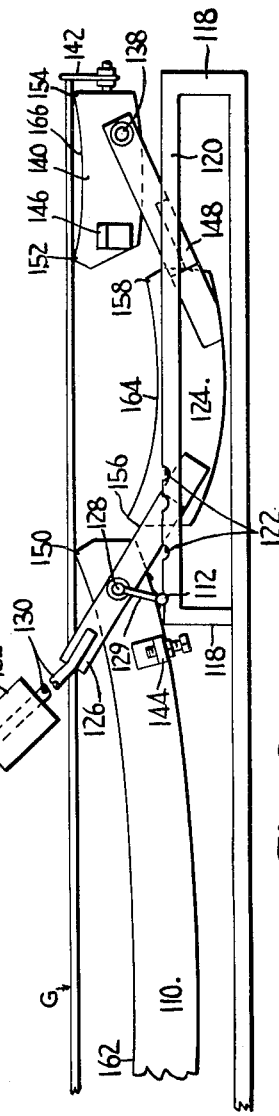
INVENTORS
LLOYD V. BLACK and
HAROLD E. McKELVEY
Oscar H Spencer
ATTORNEY

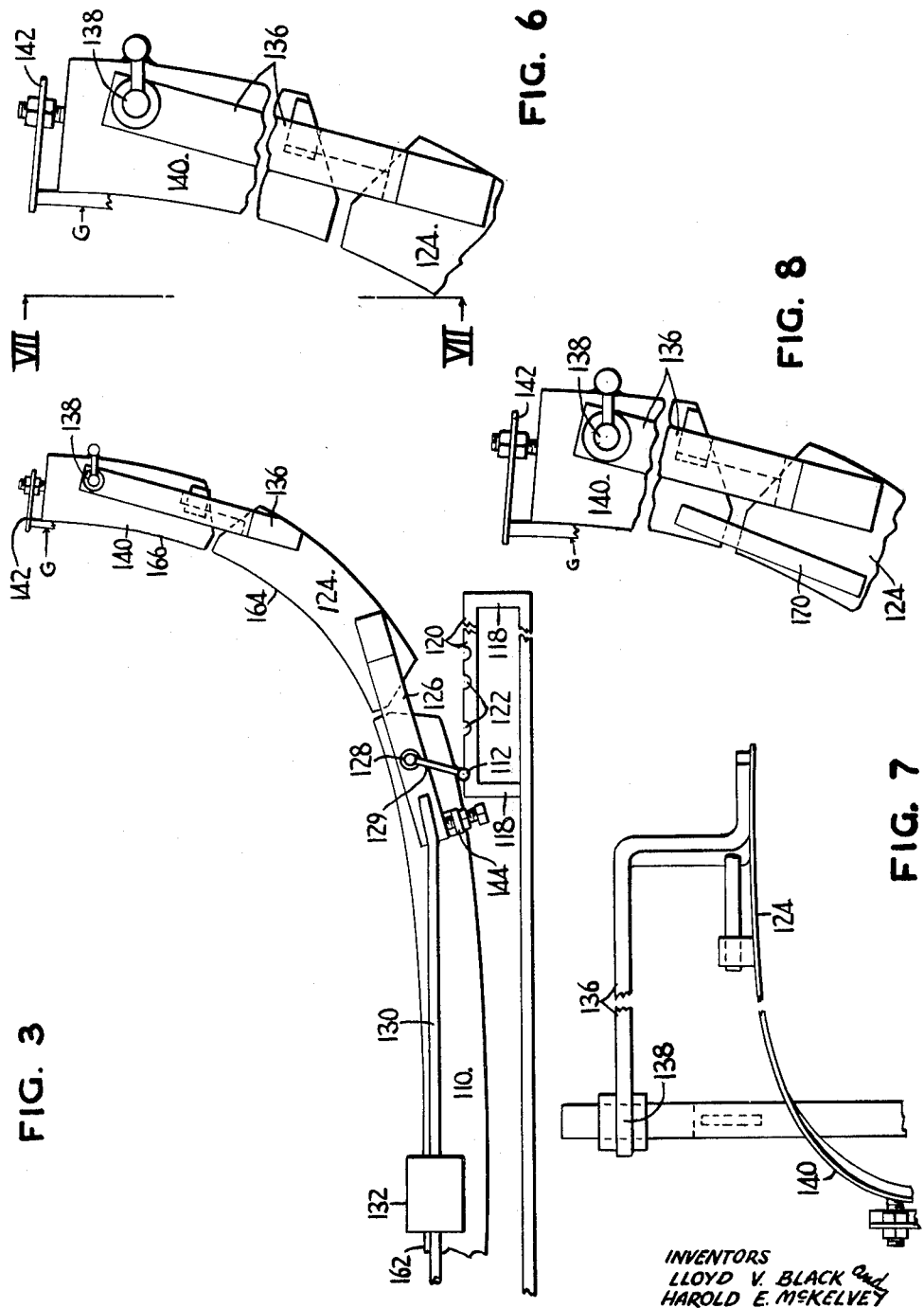

3,248,199
APPARATUS FOR BENDING GLASS
Lloyd V. Black, Murphy, N.C., and Harold E. McKelvey, Rural Valley, Pa., assignors to Pittsburgh Plate Glass Company, Allegheny County, Pa., a corporation of Pennsylvania
Original application June 21, 1954, Ser. No. 438,011. Divided and this application June 3, 1959, Ser. No. 827,985
11 Claims. (Cl. 65—290)

The present application is a divisional application of application Serial No. 438,011, for Method and Apparatus for Bending Glass, filed June 21, 1954, now abandoned.

This application relates to an improved apparatus for bending glass, and specifically refers to improved bending molds of the female skeleton type designed especially for bending glass to complex shapes. The molds described herein impart a comparatively shallow bend centrally of the glass sheets. These shallow bends merge into intermediate portions where the radius of curvature of the bends diminishes rapidly. The extremities of the glass are bent to such a degree that the tangent to the surface of the bent glass is rotated on the order of 90 degrees from the tangent to the center of the glass. In addition, the opposed lateral edges of the glass extremities may be bent to different degrees of curvature, thus imparting a conical bend in these regions.

Glass bending molds comprising a center section fixed on a mold supporting member and spaced opposing wing sections, each located at either longitudinal extremity of the fixed center section, each pivotable about an axis to a spread position to support a flat sheet of glass spanning the mold and rotatable into a closed position providing a continuous skeletonized surface having the desired contour of the bent glass are well known, as seen in Patent No. 2,330,349 to Henry J. Galey. In such molds, the wing sections are counterweighted to produce bending moments tending to rotate the wing sections from the spread position to a closed position. Such molds were developed initially for bending relatively small sheets of glass into comparatively shallow cylindrical curves. Today, the requirements of automobile manufacturers demand larger sheets of glass shaped to very complex bends. These additional requirements bring out certain latent deficiencies in bending molds of the type previously acceptable, unless certain additional precautions not required previously are taken.

According to the prior art, bending of glass sheets is accomplished by heating flat glass supported between stop members located at the extremities of the wing sections of the mold. Heat is applied to the glass, the glass softens, and the bending moments supplied by the weights close the mold, the heat softened glass moving to conform to the continuous skeleton structure resulting from closing the mold by a combination of heat sagging and force applied to the glass extremities via the stop members. The entire glass sheet is slid into alignment with the closing mold.

Unless both ends of the flat glass sheets sag and slide equally during the bending operation the sheet may get out of alignment with the mold. In cases where it is desired to bend small glass sheets into cylindrical curves, any misalignment due to unequal sagging or unequal sliding, or both, does not affect the curvature of the finished product materially. However, when bending to complex curvatures is desired, any misalignment of the glass due to non-uniform sliding of the glass on the mold as the mold moves from open to closed position results in the formation of undesired curvatures in the glass due to the difference in size of the extremities of the misaligned glass. This error in curvature is magnified with larger sheets and more complex curvatures.

When a sheet of flat glass is laid upon a female type skeleton mold in the open position, the flat glass forms a span between the outer extremities of the wing portions of the mold. The increased size of windshields has provided such a long span between the mold extremities that the weight of the glass itself is sufficient in some cases to fracture the flat glass sheet spanning the mold. According to certain embodiments of the present invention, additional intermediate support points are provided on the mold in a common plane to engage and support the undersurface of the flat glass as the latter is laid upon the open mold.

Another benefit obtained from the provision of intermediate supports is to eliminate the tendency of the glass to pivot about a longitudinal axis substantially parallel with the span formed by the glass across the mold due to the fact that the center of gravity of the glass is outside the axis defined by the support points provided by the mold extremities. At least one intermediate support point is required to be on the opposite side of the center of gravity from the axis of support in order to preclude such transverse pivoting, which results in transverse misalignment and rejectable bends.

The size of the bending moments provided to close the mold is very important. These moments should be sufficiently small so that the weight of the glass upon the open mold more than compensates for the tendency for the mold to close. As the glass and the mold are heated in a bending lehr, the heated glass sags to conform to the mold, especially its fixed center portion, thus reducing the counterbalancing force of the weight of the glass. Toward the end of the bending operation when a large portion of the glass weight is supported on the central portion of the mold, the bending moments tending to close the mold operate to rotate the wing portions into closed position, thereby raising the end portions of the glass into conformity with the wings of the mold. Bending moments of the proper magnitude insure that the wings are closed at the proper phase of the bending cycle.

Further precautions are sometimes required when it is desired to twist the longitudinal extremities of the glass relative to the cylindrical curve imparted centrally. This is accomplished by cutting each of the counterweighted wing sections to provide end molding members freely rotatable about a hinge connected to the counterweighted portion by means of an outrigger. In this embodiment of the invention, the end members are arranged to rotate about the counterweighted hinge to support the flat glass at both their inboard and outboard longitudinal extremities when the mold is spread to receive flat glass preparatory to bending.

The flat glass is primarily supported at the longitudinal outboard extremities of the fixed center section in this embodiment. Thus, the extremities of the glass are supported at a plurality of points during the lifting operation, thereby providing more intimate localized control of the glass bending in these regions, thus enabling the extremities of the glass to be bent into conical bends wherein one lateral edge of a glass extremity is rotated to a greater degree than the other lateral edge of the extremity. Such molds are also useful in bending extremely pointed glass sheets and glass sheets whose longitudinal axis extending between the extremities of the glass falls outside the center of gravity.

The non-localized distribution of the upward bending force provided by the freely rotatable end molding members pivoted about a counterweighted hinge minimizes the tendency of the extremities of the glass to overbend or be rotated more than the amount desired. In addition, the comparatively small span between the various points of application of the upward thrust to each extremity of the glass minimizes any tendency for reverse sagging that may be present when an upward thrust is applied at each glass extremity at a single point spaced from the fixed support points.

A primary object of the present invention is to provide an improved method and apparatus for bending glass to hitherto unattainable curvatures efficiently, especially glass sheets having dimensions greater than the maximum sizes previously bent.

Another object of the present invention is to provide an improved glass bending apparatus having a central fixed section and rotatable counterweighted sections attached thereto, and freely pivoted end sections rotatable with the counterweighted sections into a spread position for supporting flat glass sheets at the outboard extremities of the fixed center section and both the inboard and outboard extremities of the end sections.

Another object of the present invention is to provide a method of bending glass wherein a flat sheet of glass mounted on a split skeleton mold is softened by heating and the extremities of the heat softened sheet are lifted by providing a lifting force to each extremity of the glass at a plurality of points.

Still another object of the prevent invention is to provide a method and apparatus for bending flat glass into shapes wherein the longitudinal extremities of the glass are twisted relative to its center portion.

These and other objects will be apparent upon reading the following description of certain specific embodiments of various aspects of my invention, which embodiments are described for the purposes of illustration rather than limitation.

In the drawings, constituting a part of the description of the present invention:

FIGURE 1 is a plan view of an embodiment of the present invention showing the mold in closed position;

FIGURE 2 is a partial side elevational view of the mold seen in FIGURE 1 showing the mold in open position receiving a flat sheet of glass;

FIGURE 3 is a view similar to FIGURE 2 showing the mold in closed position;

FIGURE 4 is an enlarged side elevational view along the lines IV—IV of FIGURE 1;

FIGURE 5 is a view along the lines V—V of FIGURE 4;

FIGURE 6 is an enlarged sectional view taken along the lines VI—VI of FIGURE 1;

FIGURE 7 is a view taken along the lines VII—VII of FIGURE 6;

FIGURE 8 is a view similar to FIGURE 6 showing still another modification of the present invention.

Referring to FIGURES 1 through 7, a mold is provided with a central molding member 110 containing a pair of longitudinally spaced laterally disposed bars 112 extending beyond the mold and adapted for fixed securement upon a mold carrying frame provided with L-shaped longitudinal members 114 and interconnecting reinforcing members 116. Vertically extending posts 118 are provided to carry a superstructure 120 at each longitudinal extremity of the mold carrying frame. Each superstructure contains a plurality of laterally opposed grooves 122 designed to support the bars 112 in fixed relation.

A counterweighted molding member 124 provided with a pair of outriggers 126 extending inwardly at either side thereof is located at each end of center molding member 110. These outriggers are hinged to a hinge rod 128 attached by arms 129 to either end of the cross bars 112. Hinge means are located at each end of hinge rod 128 longitudinally inward and substantially linearly spaced from a plane perpendicular to shaping surface 162 of each center section shaping rail at its longitudinal extremity 150 and below said shaping surface 162. The inboard end of each outrigger contains a lever arm 130 provided with a counterweight 132. The outboard ends of counterweighted portion 124 are each provided with an outwardly extending outrigger 136 attached at its outboard extremity to a cradle hinge 138. An extreme molding member 140 cut from counterweighted member 124 is mounted for free rotation upon each cradle hinge. Guide members 142 are attached to the outboard extremity of each extreme molding member 140 for guiding the location of a flat glass sheet.

The center section 110 is provided with a stop member 144 for engagement with outrigger 126 to limit the closing rotation of the counterweighted member 124. Similarly, a stop member 146 extends laterally of the end molding member 140 to engage an abutment 148 on outrigger 136 to limit the closing movement of the end molding member. When the stop members 144 and 146 are abutted, the sectionalized mold provides a substantially continuous outline shaping surface with central molding member 110 at the longitudinal center thereof, end molding members 140 at the longitudinal extremities of said shaping surface and a counterweighted or intermediate molding member 124 extending in end-to-end relation from each extremity of the central molding member 110 to the longitudinally inner extremity of each of the end molding members 140.

Each of the mold sections comprises one or more rails disposed edgewise and shaped along their length to conform to different portions of the outline shaping surface of the closed mold. The rails of center molding member 110 have upper edge surfaces 162, the rails of the intermediate molding members 124 have upper edge surfaces 164 and the rail of each end molding member 140 has an upper edge surface 166. Each rail has an inner face and an outer face extending downward from its upper edge surface.

Each outrigger 126 is rigidly attached at its outer longitudinal extremity to the outer face of a rail of intermediate molding member 124. Its inner longitudinal extremity is rigidly attached to the outer longitudinal extremity of lever arm 130. It is located laterally outboard an outer face of intermediate molding member 124 and central molding member 110.

Each outrigger 136 is rigidly attached at its longitudinally inner end to the outer face of a rail comprising an intermediate molding member 124. Its longitudinally outer end is pivotally attached to an end molding member 140 by virtue of its attachment to a cradle hinge 138 about which the end molding member 140 is free to pivot. Cradle hinges 138 define a pivot axis for the end molding member 140 that is intermediate the inner and outer longitudinal extremities of the latter. Each outrigger 136 is located laterally outboard an outer face of an intermediate molding member 124 and its adjacent end molding member 140.

In operation, a flat sheet of glass G is mounted on the open mold in the manner shown in FIGURE 2 with its edge surfaces contacting the guide members 142. In this figure the glass is supported at points 150 at both outboard extremities of the center molding member 110 and at points 152 and 154 at the inboard and outboard extremities respectively of the extreme members 140. The latter molding members are so pivoted and cut that the mold opens outwardly to a length equalling that of the flat glass sheet G, and supporting points 150, 152 and 154 lie in a common plane to support either extremity of the flat glass.

The loaded mold is conveyed ilnto a bending lehr where heat is supplied to the glass. Upon the application of heat, the glass softens, thus tending to sag to conform to the skeleton shape of the mold. As the glass sags, molding members 124 and 140 are rotated upwardly due to the bending moment provided by the counterweights 132. End molding membed 140 is free to pivot about the cradle hinge rods 138 and is so pivoted with its center of gravity located longitudinally inwardly of said hinge rods 138, that end 152 tends to rotate downwardly and end 154 upwardly with respect to the axis defined by the ends of hinge rods 138. Thus, as the counterweighted portions 124 and 140 are rotated upwardly about hinges 128 as the glass softens, the glass, initially supported at points 152 and 154 also is supported at points 156 and 158 at the inboard and outboard extremities of counterweighted member 124. As the bending cycle continues, rotation of the members 124 and 140 continues until the glass is supported along a continuous surface defined by upper surfaces 162, 164 and 166 of molding members 110, 124 and 140 respectively with its edge surfaces in contact with the guide members 142 as shown in FIGURES 3 and 6.

FIG. 2 shows the relation of an extremity of the flat glass sheet G to an end of the mold in the open position supporting the flat sheet for bending according to the present invention and FIG. 3 shows the relation of the corresponding extremity of the glass sheet G after bending to the corresponding end of the mold after the latter has rotated into the closed mold position. Since it has been stated that both ends of the glass sheet slide equally during the bending operation, it is inherent that the length of the mold in its open position measured along the common plane of support for the flat glass sheet provided by support points 150, 152, and 154, as shown in FIG. 2, is substantially equal to the curved length of the mold in its closed mold position shown in FIG. 3.

It is sometimes difficult for end members 140 to rotate into position to provide a continuous closed surface for the mold when the end members are free to rotate. In such cases, the glass bending is incomplete. As seen in FIURE 8, a rod 170, which may be provided with a small counterweight, is added in order to enhance the tendency of end molding member 140 to rotate to closed position.

The embodiments depicted in FIGURES 1 through 8 impart an additional degree of flexibility to the curvatures obtainable from a bending mold not as easily obtainable with the molds of the prior art. The latter species also insure that flat glass is positioned on the mold initially in closest possible proximity to the lowest point on the molding surface of the fixed center molding member. By hinging the extreme molding members 140 conically rather than cylindrically, the lateral edges of the glass extremities can be twisted with respect to each other during the glass bending operation, as the glass is softened by heating and the mold is rotated from its open to its closed position.

The latter embodiment of mold structure is also advantageous in bending flat sheets of glass whose ends are extremely pointed, since the plurality of thrust points provided for lifting the glass during the latter stages of glass bending minimizes the unsupported span lengths of heat softened glass, thus lessening any tendency of the glass to sag or kink during this critical phase of the bending cycle. In addition, the additional flexibility of providing freely rotatable extreme molding members facilitates bending glass sheets whose longitudinal axis extending between the extremities of the glass falls outside its center of gravity by providing additional spaced points of support on either side of the longitudinal axis passing through the center of gravity.

In the above description and in the accompanying claims, the terms "cut" and "cut points" are not intended to refer to the manner of fabricating the mold, but to provide a term to describe the location of the extremities of the various mold sections or molding members which lie in juxtaposition when the molds are closed. Each molding member may be fabricated individually and the individual members assembled to form the mold, or the mold may be formed initially as a unitary structure and the individual sections cut therefrom. The specific manner of making the molds forms no part of the present invention.

Various embodiments of apparatus capable of bending flat sheets of glass into various complex shapes by utilizing our novel principle have been presented. This principle involves utilizing a mold of such a structure that flat glass is placed in as low a position as possible in the mold to provide a minimum of vertical sagging and the extremities of the mold lift the extremities of the glass to shape the glass to that defined by the mold in closed position. The embodiments described illustrate several applications of this principle. However, the scope of the present invention is not limited to the particular structural features described except as limited by the accompanying claims.

What is claimed is:

1. A skeletonized, sectionalized mold for bending glass sheets comprising
    a central molding member comprising a pair of laterally spaced, longitudinally extending rails having an upper shaping surface,
    an end molding member located at each longitudinal extremity of said mold,
    an intermediate molding member interposed between each end molding member and said central molding member,
    inboard hinge means located longitudinally inward and substantially linearly spaced from a plane perpendicular to the shaping surface of said rail at the longitudinal extremity thereof and located below said upper shaping surface for pivoting said intermediate molding member relative to said central molding member about said inboard hinge means,
    outboard hinge means located longitudinally outward and substantially linearly spaced from the longitudinally outer end of each said intermediate molding member for pivoting said end molding member relative to said intermediate molding member about said outboard hinge means,
    each molding member having an upper surface of concave elevation conforming in elevation and outline to the shape desired for a different portion of the glass sheet after bending,
    said central molding member having longitudinal extremities lying in a common plane,
    said intermediate and end molding members pivoting into a spread mold position wherein the inner and outer longitudinal ends of the end molding members are disposed in a plane occupied by the longitudinal extremities of the center molding member and the remainder of the upper surfaces of said molding members lie below said plane,
    said intermediate and end molding members pivoting into a closed mold position wherein their upper surfaces extend in end-to-end relation from the longitudinal extremities of said central molding member to form a substantially continuous curved shaping surface,
    the length of the substantially continuous curved shaping surface being substantially equal to the length of the mold in the spread mold position measured along said plane occupied by the inner and outer longitudinal ends of the end molding members, and the longitudinal extremities of the central molding member.

2. Apparatus as in claim 1, wherein said inboard hinge means and said outboard hinge means constitute the only pivotal connections between said molding members.

3. Apparatus as in claim 1, wherein said outboard hinge means is located intermediate the inner and outer longitudinal ends of each said end molding member.

4. Apparatus as in claim 1, further including a mold support frame and means rigidly attaching said central molding member to said support frame.

5. Apparatus as in claim 1, wherein
    weight means located on the longitudinally inner side of said inboard hinge means is rigidly attached to each intermediate molding member to urge the latter to pivot upward about said inboard hinge means, and additional weight means located on the longitudinally inner side of said outboard hinge means is rigidly attached to each end molding member to urge the latter to pivot upward about said outboard hinge means.

6. A mold for bending glass sheets comprising
a central molding member,
an end molding member at each end of the mold,
an intermediate molding member interposed between each end molding member and said central molding member,
inboard hinge means for pivoting each intermediate molding member to said central molding member,
outboard hinge means for pivoting each end molding member to said intermediate molding members,
weight means located on the longitudinally inner side of said inboard hinge means is rigidly attached to each intermediate molding member to urge the latter to pivot upward about said inboard hinge means, and
additional weight means located on the longitudinally inner side of said outboard hinge means is rigidly attached to each end molding member to urge the latter to pivot upward about said outboard hinge means.

7. In a bending mold for bending glass sheets, a first mold section comprising an end of the mold, a second mold section aligned in end-to-end relation with said first mold section, means for mounting said first mold section above said second mold section and for swinging rotative movement from a first position away from said second mold section to a second position in which the first mold section forms substantially a continuation of the second mold section and together said mold sections define a curvature to which a glass sheet is to be bent, a guide plate connected to said first mold section for contacting an edge surface of a glass sheet during the bending thereof and while said first mold section is moving from the first to the second position, means for supporting the second mold section for pivotal movement through an arc of fixed radius about a fixed axis, and means for connecting said mold sections to one another whereby the movement of said mold sections is synchronized.

8. In a bending mold as defined in claim 7, wherein the axis of pivotal movement of the second mold section is located adjacent the end thereof away from the first mold section.

9. In a bending mold as defined in claim 7, wherein a rotatable shaft is located at the axis of rotation of the first mold section and is operatively connected to said mold section, and means for supporting said shaft for lateral movement toward the second mold section.

10. In a bending mold for bending glass sheets, a first mold section comprising an end of the mold, a second mold section aligned in end-to-end relation with said first mold section, means for mounting said first mold section above said second mold section and for swinging rotative movement from a first position away from said second mold section to a second position in which the first mold section forms substantially a continuation of the second mold section and together said mold sections define at least a portion of a curvature to which a glass sheet is to be bent, a glass contacting member connected to said first mold section and located beyond said end of the mold formed by said first end section for contacting an end of a glass sheet during the bending thereof and while said first mold section is moving from the first to the second position, means for supporting the second mold section for pivotal movement through an arc of fixed radius about a fixed axis, and means for connecting said mold sections to one another whereby the movement of said mold sections is synchronized.

11. In a bending mold for bending glass sheets, a first mold section comprising an end of the mold, a second mold section aligned in end-to-end relation with said first mold section, means for mounting said first mold section above said second mold section and for swinging rotative movement from a first position away from said second mold section to a second position in which the first mold section forms substantially a continuation of the second mold section and together said mold sections define at least a portion of a curvature to which a glass sheet is to be bent, means for supporting the second mold section for pivotal movement through an arc of fixed radius about a fixed axis, and means for connecting said mold sections to one another whereby the movement of said mold sections is synchronized.

References Cited by the Examiner

UNITED STATES PATENTS

| | | | |
|---|---|---|---|
| 760,959 | 5/1904 | Connington | 65—158 |
| 2,330,349 | 9/1943 | Galey | 65—291 |
| 2,348,279 | 5/1944 | Boyles et al. | 65/288 |
| 2,551,606 | 5/1951 | Jendrisak | 65/107 |
| 2,551,607 | 5/1951 | Jendrisak | 65/291 |
| 2,663,974 | 12/1953 | Thomson | 65/289 |
| 2,688,210 | 9/1954 | Jendrisak | 65/287 |
| 2,691,854 | 10/1954 | Rugg | 65/26 |
| 2,737,758 | 3/1956 | Jendrisak | 65/290 |
| 2,774,189 | 12/1956 | Jendrisak | 65/290 |
| 2,814,164 | 11/1957 | Carson et al. | 65/290 |
| 2,859,561 | 11/1958 | Jendrisak | 65/290 |

FOREIGN PATENTS

| | | |
|---|---|---|
| 710,393 | 6/1954 | Great Britain. |

DONALL H. SYLVESTER, *Primary Examiner.*

CHARLES R. HODGES, ARTHUR P. KENT, F. W. MIGA, *Assistant Examiners.*